(12) United States Patent
Schuele (10) Patent No.: US 10,031,731 B2
(45) Date of Patent: Jul. 24, 2018

(54) METHOD FOR CHECKING INVARIANTS IN PARALLEL PROGRAMS (71) Applicant: Siemens Aktiengesellschaft, Munich (DE)

(72) Inventor: Tobias Schuele, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 81 days.

(21) Appl. No.: 15/314,110

(22) PCT Filed: Apr. 7, 2015

(86) PCT No.: PCT/EP2015/057469
§ 371 (c)(1),
(2) Date: Nov. 28, 2016

(87) PCT Pub. No.: WO2015/180877
PCT Pub. Date: Dec. 3, 2015

(65) Prior Publication Data
US 2017/0123770 A1   May 4, 2017

(30) Foreign Application Priority Data

May 28, 2014 (DE) .......................... 10 2014 210 192

(51) Int. Cl.
*G06F 8/41* (2018.01)
*G06F 9/52* (2006.01)
*G06F 11/36* (2006.01)

(52) U.S. Cl.
CPC .............. *G06F 8/433* (2013.01); *G06F 9/524* (2013.01); *G06F 11/3624* (2013.01); *G06F 11/3644* (2013.01)

(58) Field of Classification Search
None
See application file for complete search history.

(56) References Cited

U.S. PATENT DOCUMENTS

| 7,013,460 B2 * | 3/2006 | Thompson | G06F 9/44589 714/E11.024 |
| 7,028,119 B2 * | 4/2006 | Hue | G06F 9/52 710/200 |

(Continued)

FOREIGN PATENT DOCUMENTS

WO    2015/180877 A1   12/2015   .............. G06F 11/36

OTHER PUBLICATIONS

Schwartz-Narbonne, Daniel et al., "Parallel Assertions for Debugging Parallel Programs", 2011, IEEE.*

(Continued)

*Primary Examiner* — Chat Do
*Assistant Examiner* — Douglas Slachta
(74) *Attorney, Agent, or Firm* — Slayden Grubert Beard PLLC (57) ABSTRACT

A method is provided for checking invariants in parallel programs using dynamic instrumentation. Invariants are provided in the source code as conventional functions and can be activated or deactivated by a user. The program is instrumented prior to or during execution of the program to allow interception of an access to the main memory unit. The addresses of the memory locations on which an invariant is dependent are automatically recorded to allow a determination of changes to the addresses. A central data structure stores an invariant for each thread, associated memory address locations, and a Boolean value indicating whether the recording process is active. A corresponding library function is requested for each load command and each storage command via the instrumentation, records the respective addresses in the event of loading commands as long as the recording process is activated, and checks the respective invariants in the event of storage commands.

5 Claims, 5 Drawing Sheets

(56) References Cited

U.S. PATENT DOCUMENTS

| | | | | |
|---|---|---|---|---|
| 7,328,374 | B2* | 2/2008 | Alexander, III | G06F 11/3612 714/42 |
| 7,577,935 | B2* | 8/2009 | Reynolds | G06F 8/30 717/106 |
| 7,581,215 | B1* | 8/2009 | Song | G06F 8/433 717/159 |
| 2007/0022411 | A1* | 1/2007 | Tromey | G06F 9/44589 717/140 |
| 2008/0301163 | A1* | 12/2008 | Rouson | G06F 8/437 |
| 2011/0173592 | A1* | 7/2011 | Elnozahy | G06F 11/3692 717/131 |
| 2012/0151449 | A1* | 6/2012 | Maeda | G06F 8/74 717/126 |
| 2013/0007529 | A1* | 1/2013 | Pistoia | G06F 11/3608 714/38.1 |
| 2013/0133064 | A1* | 5/2013 | Goyal | H04L 63/0254 726/22 |
| 2014/0208431 | A1* | 7/2014 | Archer | G06F 21/577 726/25 |
| 2014/0283040 | A1* | 9/2014 | Wilkerson | G06F 21/52 726/22 |

OTHER PUBLICATIONS

Dinh, Minh Ngoc et al., "Assertion Based Parallel Debugging," 11th IEEE/ACM International Symposium on Cluster, Cloud and Grid Computing, 10 pages, 2011.

Schwartz-Narbonne, Daniel et al., "Parallel Assertions for Debugging Parallel Programs," Formal Methods and Models for Codesign, 10 pages, 2011.

Schwartz-Narbonne, Daniel et al., "Parallel Assertions for Debugging Parallel Programs," Formal Methods and Models for Codesign (MEMOCODE), 10 pages, 2011.

Schwartz-Narbonne, Daniel et al., "Parallel Assertions for Architectures with Weak Memory Models," Automated Technology for verification and Analysis; Springer Berlin Heidelberg, 15 pages, 2012.

German Office Action, Application No. 1.02014210192.1., 9 pages, dated Jan. 23, 2015.

International Search Report and Written Opinion, Application No. PCT/EP2015/057469, 19 pages, dated Jun. 23, 2015.

* cited by examiner

```
// Flag indicating availability of new message
bool available;
// String containing the message
char *message;

// Receives a message and processes it
void receiver() {
  // ...
  while(!available) {
    // wait
  }
  process_message(message);
  //...
}                                                              ⎯ R // Creates a message and sends it
void sender() {
  // ...
  message = create_message();
  available = true; // might be executed before 'message' is set
  // ...
}                                                              ⎯ S int main() {
  available = false;
  message = NULL;
  // start sender and receiver in parallel...
}
```

FIG 5

```
main():
available=false;
message=NULL;

sender():                    | receiver():
                             | while(available) {}
available=true;              | process_message(message); // ERROR (message==NULL)
// order violation
message=create_message();
```

FIG 6

```
// If 'available' is true, 'message' must not be NULL
bool is_valid() {
    return !available || message != NULL;
}
int main() {
    available=false;
    message=NULL;
    inv_begin(is_valid());
    // start sender and receiver in parallel...
    inv_end();
}
```

FIG 7

```
main()
    inv_begin(is_valid)
        | is_valid | {} | true |
        is_valid()
            mem_load(&available)
                | is_valid | {&available} | true |
            mem_load(&message);
                | is_valid | {&available, &message} | true |
        | is_valid | {&available, &message} | false |
    sender()
        mem_store(&available) // available=true;
            is_valid() // returns false
                cerr << "Invariant does not hold" << endl;
```

METHOD FOR CHECKING INVARIANTS IN PARALLEL PROGRAMS

CROSS-REFERENCE TO RELATED APPLICATIONS

This application is a U.S. National Stage Application of International Application No. PCT/EP2015/057469 filed Apr. 7, 2015, which designates the United States of America, and claims priority to DE Application No. 10 2014 210 192.1 filed May 28, 2014, the contents of which are hereby incorporated by reference in their entirety.

TECHNICAL FIELD

The invention relates to a method for checking invariants in parallel programs.

BACKGROUND

The majority of modern processors consist of a plurality of processor cores working in parallel. In order to be able to fully utilize the power of such multi-core processors, the applications that are to be executed on them must be parallelized.

The development of parallel software is, however, highly subject to errors, especially since it is very difficult to maintain an overview of the large number of different flow scenarios in one parallel program.

Typical faults in programs that are running in parallel or concurrently are:
  deadlocks which can lead to the system locking up through circular dependencies between a plurality of threads
  race conditions, which always occur when a plurality of threads access common data without synchronization.
  Race conditions can have the following causes here:
  atomicity violations, in which an operation has only partially been executed and is interrupted by another operation before it has completed.
  order violations in which the intended sequence of a plurality of operations is not maintained as a result of optimizations made by the compiler or processor.
  visibility violations, in which the result of one operation is not immediately written back into the main memory and is therefore invisible for other threads.

A simple example of atomicity violations is the incrementation of an integer variable. Three steps are usually necessary for this: reading the current value from the memory, adding one, and saving the new value. If these three steps are not executed atomically, it can happen that changes to the variable are lost (lost updates).

Special methods and tools which allow the correctness of programs running in parallel to be checked are required to avoid such errors. Classical methods such as testing and debugging are not, however, adequate for this purpose.

A variety of tools and methods exist which assist the discovery of faults in parallel programs. Dynamic analysis methods, wherein the program to be investigated is executed and examined for race situations, deadlocks and so forth, are the most common.

Examples of such tools include the Intel® Inspector, the Oracle Thread Analyzer, Helgrind/DRD and ThreadSanitizer. These known tools are, however, all restricted to relatively simple faults. It is not, however, possible to check more complex properties such as invariants with them, where an invariant refers to a property that must always be satisfied in a particular section of the program. A further disadvantage of these approaches is that they are typically not employed until the program to be developed is already largely finished.

As in the case of sequential programming, it is more helpful to stipulate properties in the program code by means of assertions as early as the development stage. Such an approach is described in D. Schwartz-Narbonne, F. Liu, T. Pondicherry, D. August, S. Malik, "Parallel Assertions for Debugging Parallel Programs. Formal Methods and Models for Codesign (MEMOCODE' 11), IEEE 2011. This approach also, however, is restricted to relatively simple properties, and does not allow the specification of arbitrary invariants. It also requires a modification to the compiler, which, however, heavily restricts its practical application.

SUMMARY

One embodiment provides a method for checking invariants in a parallel program, wherein an invariant in the form of a function without parameters which returns a Boolean value is declared, wherein functions for specifying the scope of validity of invariants by the user, and functions for automatic calling with load and store commands are present in a library and are available as binary library code, wherein the source code of a program is first supplemented by the invariants to be checked, wherein this is done with the aid of the functions for specifying the scope of validity of invariants in the form of an invariant begin function and of an invariant end function, wherein the source code, along with the program and the invariants, is translated into a corresponding executable file which is then instrumented with the aid of the binary library code and executed, wherein an internal data structure is generated in which at least one respective invariant is stored, wherein the respective invariant comprises at least one memory location on which it depends, and a Boolean value which indicates whether recording is enabled, wherein, through the execution of the begin invariant function, the recording of the invariant concerned is activated and is carried out, along with the corresponding entry in the internal data structure being reset by the end invariant function, and wherein a corresponding load function of the functions for automatic calling with load and store commands is called by the instrumentation for each load command and records the addresses of memory locations concerned for as long as the recording is enabled, and a corresponding store function of the functions for automatic calling with load and store commands is called for each store command and checks the invariants concerned for their validity.

In one embodiment, an internal data structure in the form of a table is generated, in which a respective invariant is stored for each thread, wherein the respective invariant comprises at least one memory location on which it depends and a Boolean value that indicates whether recording is enabled.

In one embodiment, in the case of nested invariants, the address sets are replaced in the data structure by a stack of address sets, wherein the topmost address set is assigned to the innermost invariant.

In one embodiment, with dynamically generated data structures, the addresses relevant for the check are not only determined once at the beginning, but at every change of an affected memory location.

In one embodiment, in addition to the data structure, a hash table is created in which an entry is made for every address under observation containing pointers to the entries concerned in the data structure, and wherein searching through all the entries is performed with the aid of this hash table in the store function of the functions for automatically calling with load and store commands.

In one embodiment, an error message is output for as long as an invariant is not valid or is no longer valid.

BRIEF DESCRIPTION OF THE DRAWINGS

Example aspects and embodiments of the invention are explained in more detail below with reference to the drawings, in which.

DETAILED DESCRIPTION

Embodiments of the present invention provide a method for checking arbitrary variants in parallel programs at runtime.

Some embodiments provide a method for checking invariants in parallel programs, using dynamic instrumentation, wherein the invariants in the source code are stated as conventional functions and can be enabled or disabled by the user through function calls, wherein the program is instrumented prior to or during the execution in order to be able to intercept accesses to the main memory, wherein the addresses of the memory locations on which an invariant depends are automatically recorded in order to be able to detect changes, wherein there is a central data structure which, for each thread stores an invariant, the addresses of the memory locations on which the invariant depends, and a Boolean value that indicates whether the recording is enabled, and wherein for each load command and each store command a corresponding library function is called by the instrumentation which, in the case of load commands, records the addresses concerned provided the recording is enabled, and in the case of store commands checks the invariants concerned. The primary advantage of this method in contrast to conventional approaches is that arbitrary invariants can be specified through the state of a parallel program, whereby not only can fundamental errors such as race situations and deadlocks be detected, but also inconsistencies in the commonly used data structures.

Figure 1:
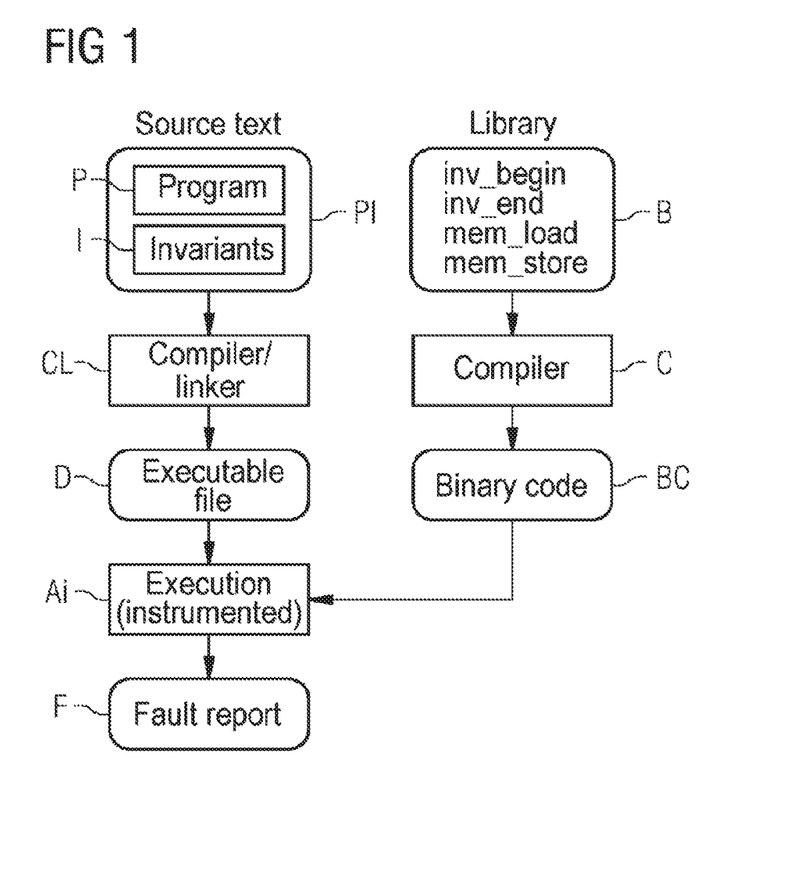
FIG. 1 shows an overview of a method according to the invention for checking invariants.

FIG. 1 shows an overview for explaining the sequence of an exemplary embodiment of the method according to the invention for checking invariants. The source code PI of the actual program P is first supplemented with the invariants I that are to be checked, and it is translated. The result is an executable file D, which is then instrumented. This involves all the load and store commands being replaced by the functions mem_load and mem_store, which are elements of a library. This library also contains a begin invariant function inv_begin and an end invariant function, inv_end, through which the user can specify the scope of validity of invariants. If an error occurs during the execution Ai of the instrumented program, a corresponding error message F is output. An invariant is quoted in the form of a function without parameters that returns a Boolean value, wherein the function returns "true" when the invariant is satisfied, and otherwise returns "false".

Figure 2:
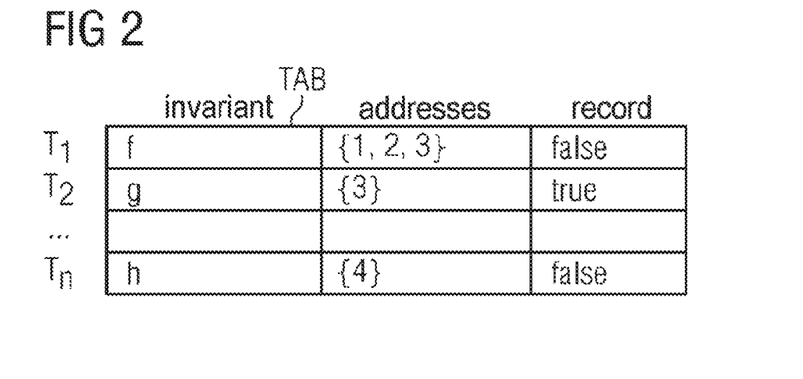
FIG. 2 shows an illustration of a corresponding data structure for the management of invariants for explaining the method according to the invention.

An internal data structure in the form of a table TAB, shown in FIG. 2, is present for managing the invariants. For every thread $T_1 \ldots T_2$ the function name of the invariant and the addresses of the memory locations on which this invariant depends are stored in this table. The addresses are determined at runtime, in that while a function is executing a log is kept of its memory accesses. For this purpose, a flag record is additionally maintained in the table for every entry, indicating the recording of the address. In FIG. 2, for example, the invariant of the thread $T_1$ specified by the function f depends on the memory locations with addresses 1, 2 and 3, and the recording has been completed since the flag record has already been set to "false". For the invariant of the thread $T_2$ specified by the function g, on the other hand, the recording is still running, since the flag record is still set to "true".

Figure 3:
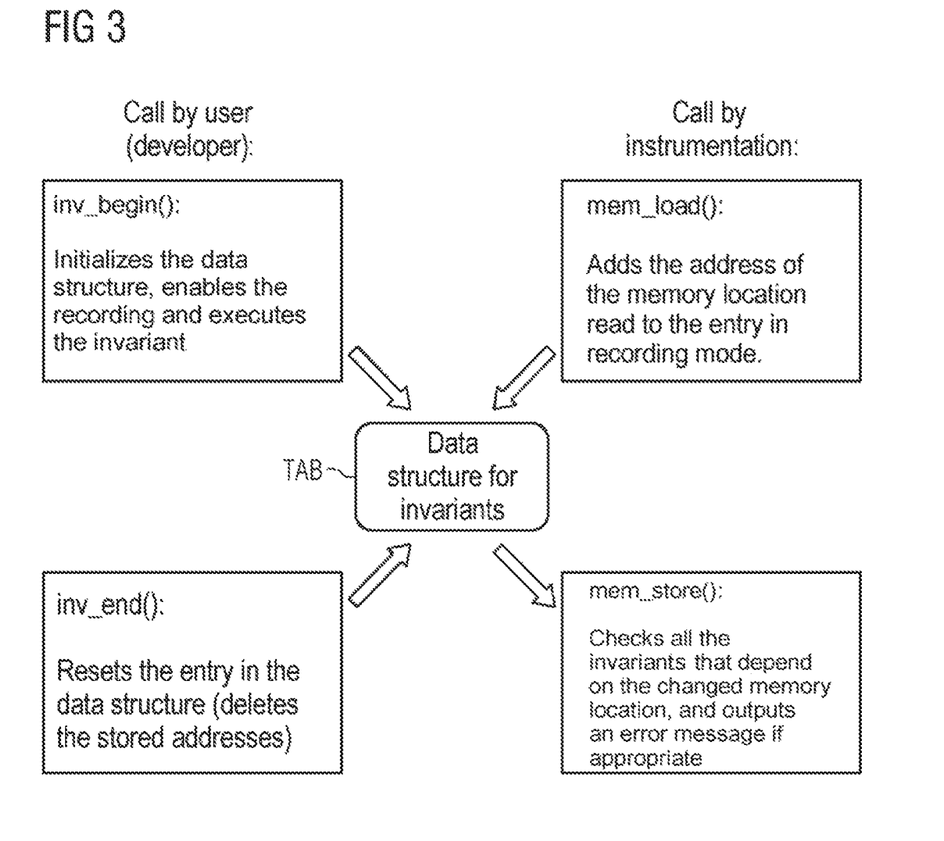
FIG. 3 shows an illustration for explaining the interaction of the operations of the method according to the invention.

FIG. 3 sketches the interaction of the functions inv_begin, inv_end and of mem_load, mem_store during accesses to the central data structure, wherein the first—as already explained—are called by the user, and the latter are called by the instrumentation during execution of a load or store command.

The function inv_begin initializes the data structure, enables the address recording, and executes the invariants. The recording is then stopped, in that the flag record associated with the thread concerned is again set to "false".

At the end of an invariant check inv_end the corresponding entry is reset by deleting the addresses.

The mem_load function adds the address of the memory location that has been read to the set of addresses in the table TAB, although only when recording is enabled. Otherwise it has no effect.

The mem_store function reacts to changes at memory locations on which one or more invariants depend. To do this, it evaluates all the invariants concerned again, and, if relevant, issues an error message, wherein a change to the memory locations or memory addresses can have the result that a previously valid invariant is no longer valid or no longer applies, i.e. has the value "false".

A listing is appended to the end of the description, showing a prototype implementation of the method according to the invention in the C++ programming language.

Figure 4:
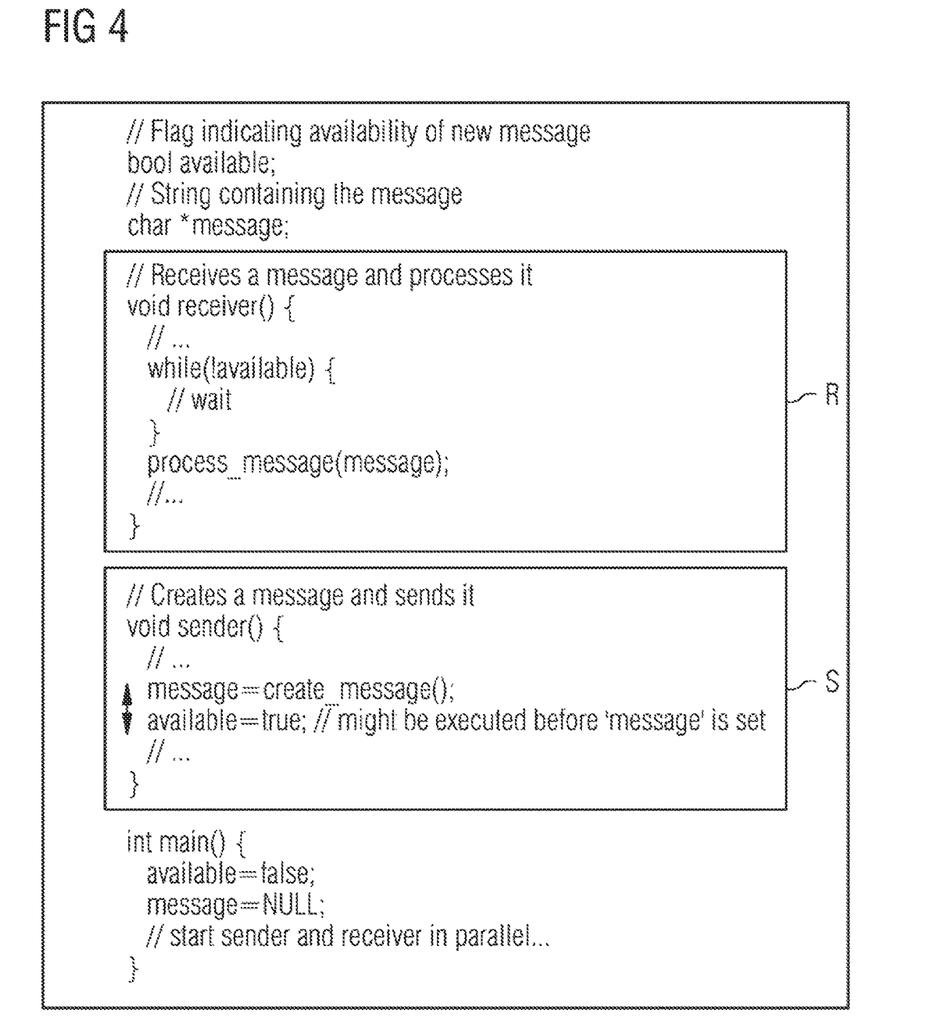
FIG. 4 shows an exemplary faulty program for further explaining the method according to the invention.

FIG. 4 shows an exemplary faulty program, which will be used below to demonstrate the use of invariants. The program implements the exchange of messages between a sender S and a receiver R, which run in parallel. The messages are exchanged using the global variables available and message. At the beginning, the logical variable available is set to "false", and the value NULL is assigned to the pointer-variable message, which is a pointer to the actual message. After the sender has generated a new message through the instruction message=create_message( ), it sets the variable available to "true" in order to indicate to the receiver that it can fetch and process the message. The R waits with the help of a loop that terminates as soon as the variable available has adopted the logical value "true".

The problem demonstrated with this exemplary program is that the compiler and the processor can reorder the assignments within the function sender, and that a sequence violation therefore arises. As a consequence it can thus happen that the variable available is already "true" before the pointer-variable message points to a valid message. The receiver thus attempts to dereference a NULL pointer, causing the program to crash.

Figure 5:
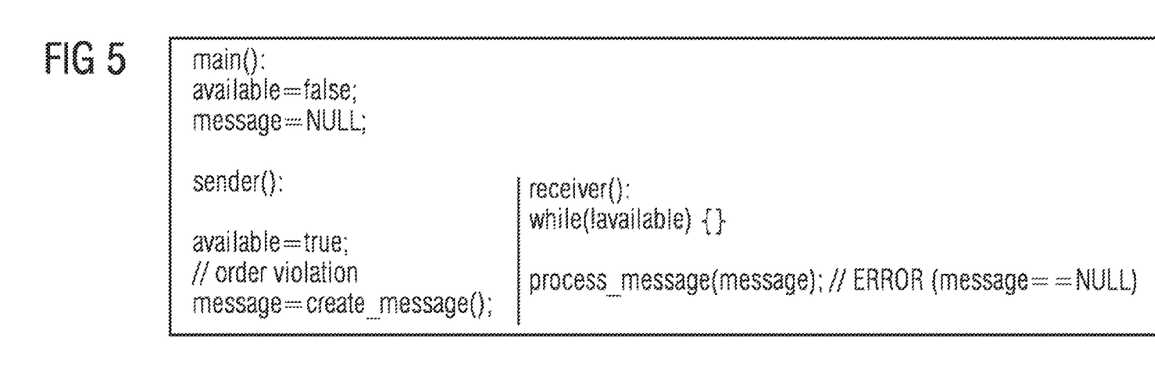
FIG. 5 shows an exemplary program for explaining the faulty execution of the program from FIG. 4 on the basis of a sequence violation in the sender( ) function.

FIG. 5 illustrates this behavior. It is to be noted that errors, in particular those resulting from reordering by the processor, often only occur sporadically, and can only be found through testing with great difficulty. With the method presented here, the fault can be detected and intercepted, in that the program is supplemented by an invariant which ensures that the pointer-variable message is never NULL when the Boolean variable available has the value "true".

Figure 6:
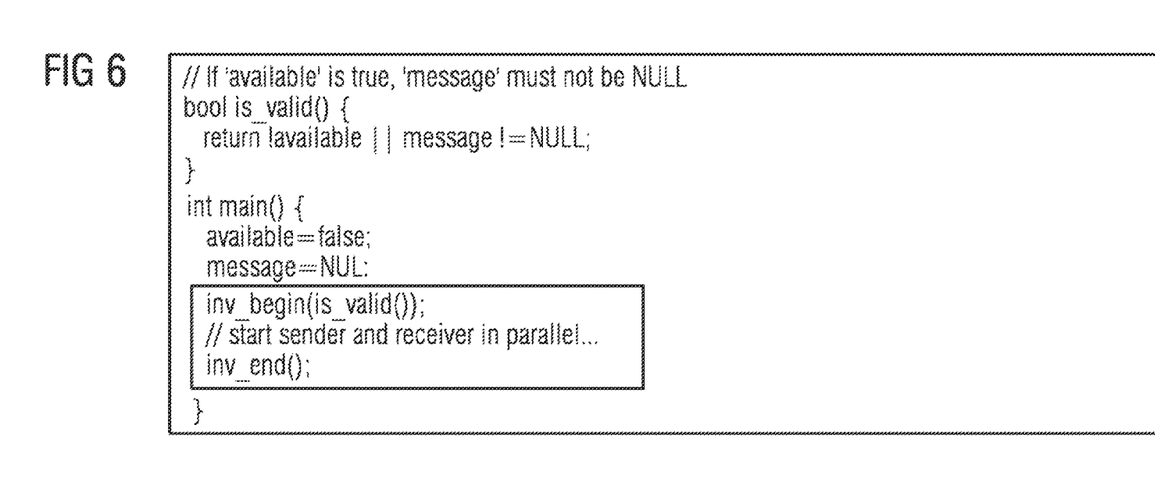
FIG. 6 shows an exemplary program of the development according to the invention of the exemplary program of FIG. 4 with an invariant for detecting the sequence violation of FIG. 5.

FIG. 6 shows the invariants and a correspondingly extended main program, in which a parallel start of the sender and of the receiver is included between the functions inv_begin and inv_end which delimit the invariant.

An invariant in the form of a function is_valid returns the value "true" if "not available" or "message not equal to NULL", or, in the event of a fault, i.e. when available and message=NULL, it returns the value "false".

Figure 7:
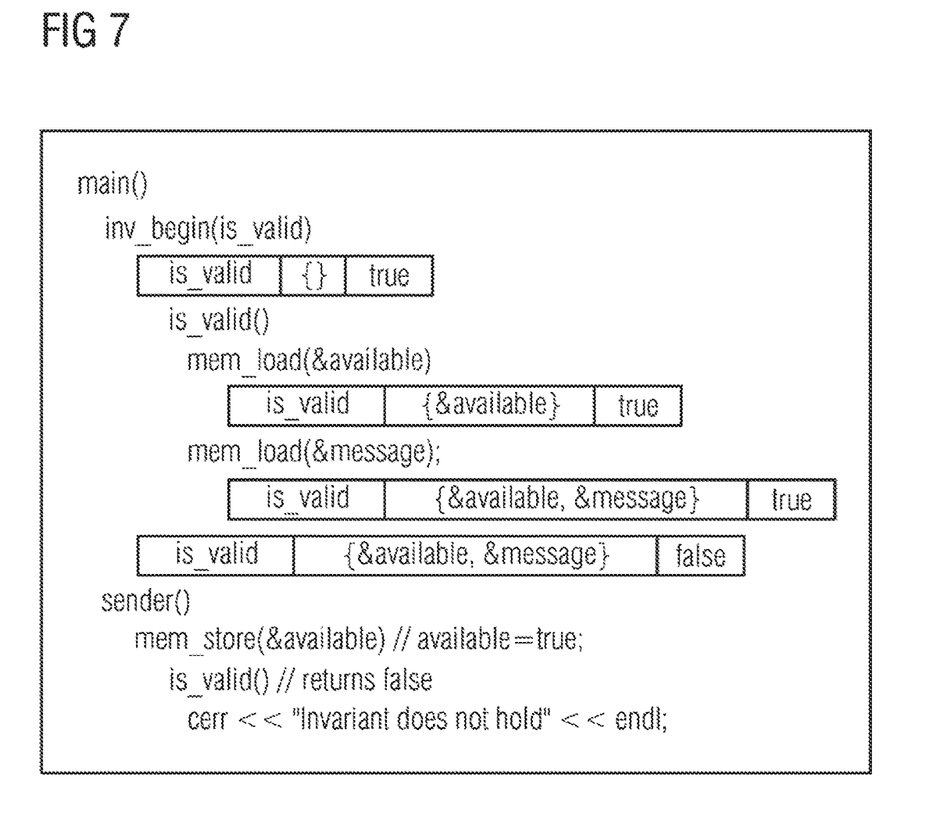
FIG. 7 shows an illustration of the program flow and the content of the data structure for the example of FIG. 6.

FIG. 7 illustrates the flow of the method presented along with the contents of the central data structure TAB for the example of FIG. 6. First, the data structure TAB is initialized within the inv_begin function, meaning that the corresponding function is_valid is called. Since the function is_valid reads the variables available and message, their associated addresses, &available and &message, are recorded under the addresses in the data structure TAB. As soon as the transmitting function sender sets the variable available to "true", the function mem_store is called, which in turn evaluates the invariant is_valid. Since the pointer-variable message at this stage is still NULL, an error message is output.

In the form presented, the method has a number of restrictions which can, however, easily be overcome if required:

In order that not just one invariant can be managed for each thread, but so that nested invariants are also possible, the set of addresses in the data structure TAB can be replaced by a stack of sets, wherein the topmost set is assigned to the innermost invariant.

In order also to support dynamically growing data structures such as, for example, lists, it is optionally possible for the relevant addresses to be determined not just once at the beginning, but at every change to an affected memory location. Thus, for example, the recording is started again when appending an element to a list. Newly added addresses are in this way also considered in the further operation of the program.

In order that in certain circumstances less time is required for searching through all the entries within the function mem_store, or so that the method is accelerated, it is optionally possible, in addition to the data structure TAB, to create a hash table in which an entry is created for every address under observation containing a pointer to the affected entries in the data structure.

In the case of static data structures, the method can optionally be simplified in that, instead of the automatic address recording, the relevant addresses are explicitly stated by the user.

Listing

```
struct invariant {
  // An invariant is a function without arguments that returns a
  Boolean value
  function<void, bool> invariant;
  // Memory locations on which the invariant depends
  concurrent_set<uintptr_t> addresses; // Flag that indicates
  whether addresses have been stored
  atomic<bool> record;
};
// Each thread has an associated invariant
invariant invariants[MAX_THREADS];
// This function must be called by the user at the beginning of an
invariant
void inv_begin(function<void, bool> inv) {
  int tid = get_current_thread_id( ); // Fetch thread ID
  invariants[tid].invariant = inv; // Store invariant
  invariants[tid].addresses.clear( ); // Delete addresses
  invariants[tid].record = true; // Enable recording
  bool result = inv( ); // Execute invariant
  invariants[tid].record = false; //Disable recording
  if(!result) { // Is the invariant satisfied?
    cerr << "Invariant is not satisfied" << endl; // Output error
  message
  }
}
// This function must be called by the user at the end of an
invariant
void inv_end( ) {
  int tid = get_current_thread_id( ); // Fetch thread ID
  invariants[tid].addresses. clear( ); // delete addresses
}
// This function is automatically called after a load command has
been executed
void mem_load(uintptr_t address) {
  int tid = get_current_thread_id( ); // Fetch thread ID
  if(invariants[tid].record) { // Is recording enabled?
    invariants[tid].addresses.insert(address); // Save address
  }
}
// This function is called automatically after a store command has
been executed
void mem_store(uintptr_t address) {
  for (int tid = 0; tid < MAX_THREADS; tid++) { // Check all the
  entries
    if(!invariants[tid].record) { // Is recording disabled?
      if(invariants[tid].addresses.find(address)) { // Is address
    found?
        if(!invariants[tid].inv( )) { // Is invariant satisfied?
          cerr << "Invariant is not satisfied" << endl; // Output error
  message
        }
      }
    }
  }
}
```

What is claimed is:

1. A method for checking invariants in a parallel program, wherein an invariant in the form of a function without parameters which returns a Boolean value is declared, and wherein functions for specifying a scope of validity of invariants by a user, and functions for automatic calling with load and store commands are stored in a library and available as binary library code, the method comprising:
  supplementing source code of a program with the invariants to be checked, including specifying the scope of validity of invariants using an invariant begin function and an invariant end function;
  translating the source code, along with the program and the invariants, into a corresponding executable file;
  instrumenting the executable file using the binary library code, and executing the instrumented executable file;
  generating an internal data structure that stores at least one respective invariant comprising at least one memory location on which the respective invariant depends, and a Boolean value indicating whether recording is enabled, each memory location having an associated address;

wherein the at least one respective invariant includes at least one nested invariant, wherein for each nested invariant, the data structure stores a stack of address sets in which a topmost address set is assigned to an innermost invariant;

executing the begin invariant function such that the recording of the invariant concerned is activated and performed, and executing the end invariant function such that the corresponding entry in the internal data structure is reset; and wherein a corresponding load function of the functions for automatic calling with load and store commands is called by the instrumentation for each load command and records the addresses of associated memory locations for as long as the recording is enabled; and wherein a corresponding store function of the functions for automatic calling with load and store commands is called for each store command and checks the invariants concerned for their validity.

2. The method of claim 1, comprising generating an internal data structure in the form of a table that stores a respective invariant for each thread, wherein the respective invariant comprises at least one memory location on which the respective invariant depends and a Boolean value that indicates whether recording is enabled.

3. The method of claim 1, comprising, for dynamically generated data structures, determining the addresses relevant for the check upon every change of an affected memory location.

4. The method of claim 1, comprising generating, in addition to the data structure, a hash table including an entry for every address under observation containing pointers to the respective entries in the data structure, and wherein searching through the entries is performed using the hash table in the store function of the functions for automatically calling with load and store commands.

5. The method of claim 1, wherein an error message is output for as long as an invariant is not valid or is no longer valid.

* * * * *